United States Patent
Ding et al.

(10) Patent No.: US 8,443,080 B2
(45) Date of Patent: May 14, 2013

(54) SYSTEM AND METHOD FOR DETERMINING APPLICATION DEPENDENCY PATHS IN A DATA CENTER

(75) Inventors: Min Ding, Chalfont, PA (US); Vishal Singh, Plainsboro, NJ (US); Yueping Zhang, Princeton, NJ (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 197 days.

(21) Appl. No.: 13/100,805

(22) Filed: May 4, 2011

(65) Prior Publication Data

US 2011/0276682 A1 Nov. 10, 2011

Related U.S. Application Data

(60) Provisional application No. 61/331,962, filed on May 6, 2010.

(51) Int. Cl.
*G06F 15/173* (2006.01)
(52) U.S. Cl.
USPC .......................................... 709/224; 709/223
(58) Field of Classification Search .................. 709/223, 709/224, 226, 232, 238
See application file for complete search history.

(56) References Cited

U.S. PATENT DOCUMENTS

| | | | | |
|---|---|---|---|---|
| 7,080,136 B2 * | 7/2006 | Duffield et al. | ............... | 709/223 |
| 7,299,283 B1 * | 11/2007 | Duffield et al. | ............... | 709/224 |
| 7,536,455 B2 * | 5/2009 | Duffield et al. | ............... | 709/223 |
| 7,734,175 B2 * | 6/2010 | Amemiya et al. | ............ | 709/226 |
| 2002/0165958 A1 * | 11/2002 | Duffield et al. | ............... | 709/224 |
| 2002/0188710 A1 * | 12/2002 | Duffield et al. | ............... | 709/232 |
| 2005/0265255 A1 * | 12/2005 | Kodialam et al. | ............. | 709/238 |

* cited by examiner

*Primary Examiner* — Quang N Nguyen
(74) *Attorney, Agent, or Firm* — Joseph Kolodka; Paul Schwarz

(57) ABSTRACT

A method and a system are disclosed for determining application dependency paths in a data center. The method and the system captures application traffic volume data on the servers with switches and monitoring agents; generates an application traffic matrix of all the components of the applications based on the application traffic volume data; estimates the number of the applications in the data center from the traffic matrix with a Rank Estimation via Singular Value Decomposition or Power Factorization Residue Errors process; and decomposes the traffic matrix into a first matrix and a second matrix with a non-negative matrix factorization process using the estimated number of applications. The first matrix represents a set of the components belonging to each of the applications and the second matrix represents the amount of traffic generated by each application over time. Any noise in the first and second matrices is removed with a concurrent volumes ratios based correlation process.

12 Claims, 8 Drawing Sheets

$X = W \times H$

FIG. 2

SYSTEM AND METHOD FOR DETERMINING APPLICATION DEPENDENCY PATHS IN A DATA CENTER

RELATED APPLICATIONS

This application claims the benefit of U.S. Provisional Application No. 61/331,962, filed May 6, 2010, the entire disclosure of which is incorporated herein by reference.

FIELD

This application relates to system management and operation. More particularly, this application relates to a system and method for determining application dependency discovery in enterprise networks and data centers.

BACKGROUND

Today's enterprise networks and modern data centers have heterogeneous applications (e.g., e-commerce, content delivery) and services (e.g., DNS, active directory, email, and authentication), which are interleaved with each other in a complicated manner. Specifically, each service may support multiple applications and a particular application may rely on many different services. Moreover, each application itself usually has multiple components, some of which may be shared with multiple applications. Understanding and identifying components and their inter-dependencies of each application is critical for a wide spectrum of system management tasks, such as anomaly detection and failure diagnosis, system upgrading and patching, and application isolation and migration. For example, a multi-tier application can include different applications, such as an auction application and an e-commerce application, which have common components, such as an application server.

Existing approaches to this problem employ a variety of techniques ranging from active server instrumentation to light-weight middleware deployment, and to non-intrusive network traffic monitoring. Application dependencies are inferred by performing correlation analysis on the obtained network and/or system traces. These approaches rely on pairwise flow analysis, which may exhibit certain limitations in practice. Specifically, multi-hop (i.e., more than three) dependencies, which are common in large-scale transaction systems, can hardly be inferred from pairwise dependency information. This is especially true in the presence of overlapping applications where a single component is shared by multiple applications, and where the accuracy of pairwise analysis decreases, as in the case of multi-hop overlapping applications. Moreover, flow pair correlation is conducted on a per-host basis within a given time interval. Choosing a proper length of this interval is critical in determining the performance and accuracy, but is also prone to false positives.

Accordingly, an automated application dependency discovery system and method is needed for daily system management and operation of enterprise networks and data centers which are experiencing large-scale growth of applications and complicated interactions between service components.

SUMMARY

A method is disclosed for determining application dependency paths in a data center having a plurality of servers and a plurality of different applications, each of the applications having a plurality of components, one or more of the components being shared with one or more of the other applications. The method comprises the steps of: capturing application traffic volume data on the servers; generating an application traffic matrix of all the components of the applications based on the application traffic volume data; estimating the number of the applications in the data center from the traffic matrix; and decomposing the traffic matrix into a first matrix and a second matrix using the estimated number of applications, the first matrix representing a set of the components belonging to each of the applications and the second matrix representing the amount of traffic generated by each application over time.

In some embodiments, the method further comprises the step of removing noise from the first and second matrices.

Also disclosed is a system for determining application dependency paths in a data center having a plurality of servers and a plurality of different applications, each of the applications having a plurality of components, one or more of the components being shared with one or more of the other applications. The system comprises a data collection component; and a controller in data communication with the data collection component. The data collection component comprises a plurality of switches each having a mirror port for capturing application traffic volume data on the servers; and a monitoring agent for monitoring each of the mirror ports. The controller comprises a connectivity graphing unit for generating an application traffic matrix of all the components of the applications based on the application traffic volume data captured by the monitoring servers; a population estimating unit for estimating the number of the applications in the data center from the traffic matrix generated by the connectivity graphing unit; and an application decomposition unit for decomposing the traffic matrix into a first matrix and a second matrix using the estimated number of applications generated by the population estimating unit, the first matrix representing a set of the components belonging to each of the applications and the second matrix representing the amount of traffic generated by each application over time.

In some embodiments, the controller of the system further comprises a postprocessing unit for removing noise from the first and second matrices.

BRIEF DESCRIPTION OF THE DRAWINGS

FIG. 2 is an exemplary embodiment of a traffic matrix which represents a traffic graph of the present disclosure.

DETAILED DESCRIPTION

The present disclosure provides a matrix factorization system and method to extract application dependencies in an enterprise network, a cloud-based data center, and other like data centers, using a temporal global application traffic graph dynamically constructed over time and spatial local traffic observed at each server of the data center. The data center comprises a plurality of servers running a plurality of different applications (e.g. e-commerce, content delivery). Each of the applications has a plurality of components (e.g., web server, application server, database server) in the application's dependency path, where one or more of the components are shared with one or more of the other applications.

Because such data centers typically host a large number of multi-tier applications, the applications requests are overlapped, both in the spatial and temporal domains, making it very difficult for conventional pairwise statistical correlation techniques to correctly extract these interleaved but independent applications. In the system and method of the present disclosure, a matrix-based representation of application traffic is used, which captures both system snapshots and their historical evolution. The system and method decomposes the matrix representation of application graphs into small subgraphs each representing a single application. This makes the system and method of the present disclosure especially effective in the presence of multi-hop and/or overlapping applications.

The number of applications is usually unknown a priori due to interleaving and overlapping application requests, which further imposes a challenge to discovery of the individual application subgraphs. In the system and method of the present disclosure, the number of applications is determined using low rank matrix estimation either with singular value decomposition or power factorization based solvers, under complete and incomplete traffic data scenarios, with theoretical bound guarantee.

Traffic tapping from switches is limited by the capability of switches as well as the monitoring hosts. A switch typically can mirror only a few ports at the same time. In addition, monitoring data collected over multiple switches, each with multiple ports, may result in high-volume aggregate network traffic and potentially packet loss. Both cases lead to significant loss in the monitoring data. To overcome this problem, the system and method of the present disclosure effectively utilizes historical data to provide sufficient redundancy and employs power factorization based techniques to provide resilience to data loss and estimation errors. The system and method of the present disclosure also uses distributed network monitoring and centralized data processing to determine application dependency paths in a data center.

Figure 1:
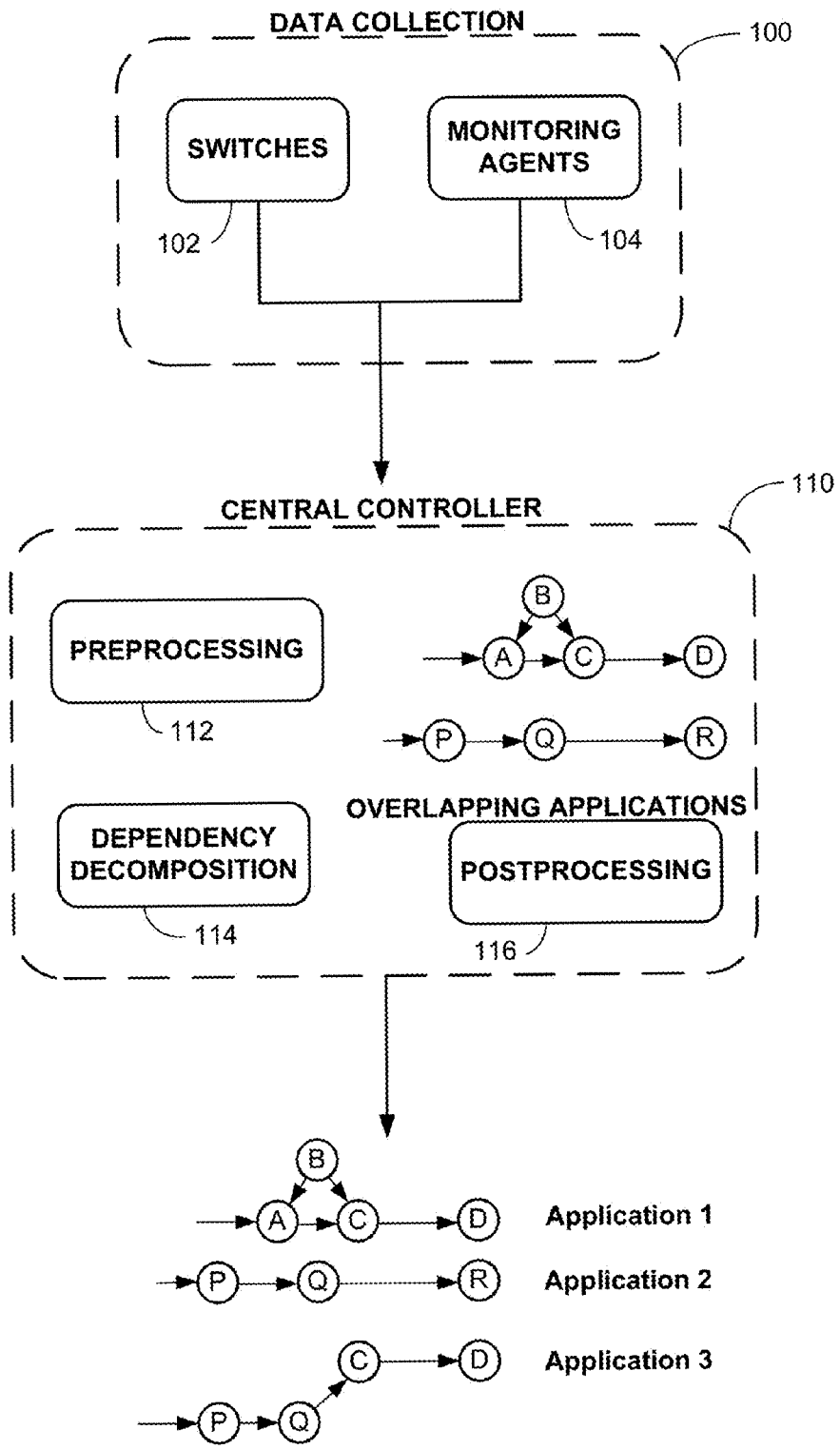
FIG. 1 is a block diagram of an exemplary embodiment of a system for determining application dependency paths in a data center, according to the present disclosure.

FIG. 1 is a block diagram of an exemplary embodiment of the system of the present disclosure. The system comprises a data collection component 100 and a central server or controller 110. The data collection unit 100 has a plurality of switches 102 and a plurality of monitoring agents 104 connected to switches and collecting traffic data from them and the central controller 110 has a preprocessing unit 112, a dependency decomposition unit 114 and a postprocessing unit 116. The preprocessing, dependency decomposition, and postprocessing units 112, 114, 116 of the controller 110 are implemented by one or more processors (not shown) of the controller 110. The processor(s) execute program instructions stored, for example, in one or more memories of the controller 110, which enable the controller 110 to perform preprocessing, dependency decomposition, and postprocessing methods and processes described herein.

The data collection component 100 performs distributed network monitoring of the data center and may comprise top-of-rack (TOR) switches (edge switches), which are located in the lowest layer in the network's tree structure with down links connected to servers of the data center (e.g., 20 to 80 servers) residing in the same rack, and up links connected to an upper-layer aggregation switch. Network traffic is captured at each edge switch 102, which is directly connected to a dedicated monitoring server 104 (monitoring agent) via a mirror port of the edge switch 102. This type of port mirroring is used due to its efficient traffic capturing capabilities with minimal impact on traversing traffic. Periodically, the monitoring server processes the collected data (parses and extracts the flow level information, counts the number of packets for each flow in the current interval), calculates the traffic volume for each application layer link, and forwards the data to the controller 110.

The data received from each monitoring server is centrally processed by the controller 110, which sequentially preprocesses, dependency decomposes, and postprocesses the information received from the monitoring servers.

Figure 2:
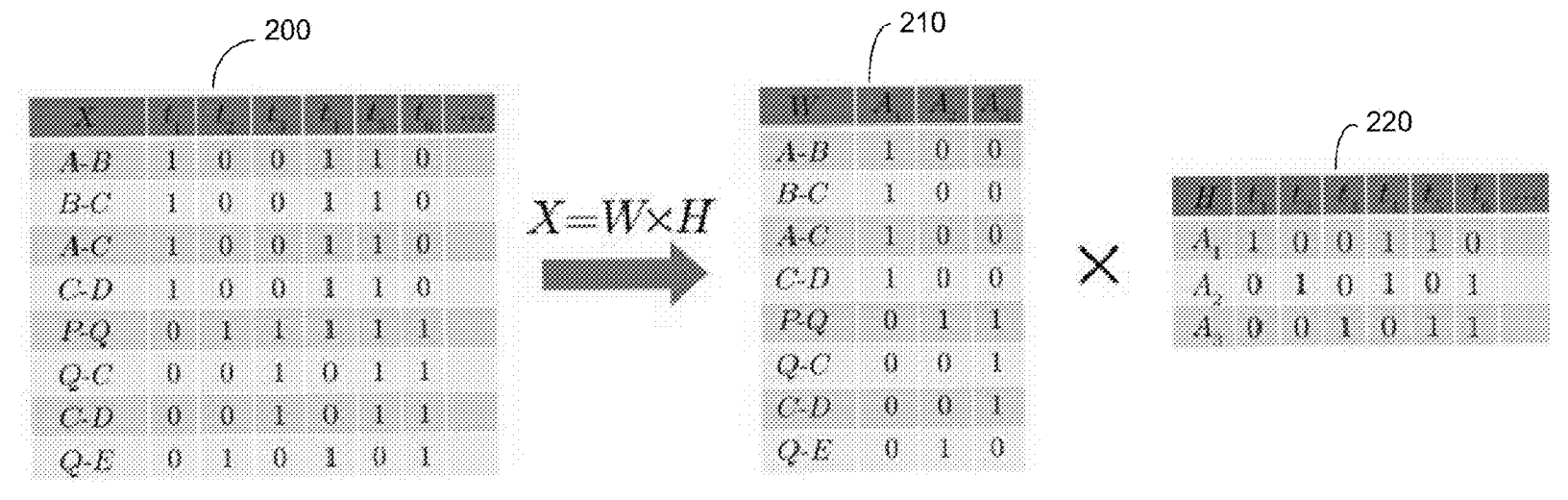

As stated earlier, once the data from all monitoring agents 104 is received, the preprocessing unit 112 of the controller 110 preprocesses the data. The preprocessing unit 112 first sanitizes the data, for example, aligning measurement intervals on different switches 102, and removing redundancy (for instance, the same packet may be captured twice if the system simultaneously monitors two switch ports where the packet traverses). After data sanitization, the preprocessing unit 112 continuously constructs complete application connectivity graphs for all application groups. Each graph is represented by a traffic matrix X, an example of which is shown in FIG. 2 and generally denoted by reference numeral 200. Each column of the traffic matrix X records the traffic volumes between all ⟨IP: port⟩ pairs observed during the corresponding time interval and each row of the traffic matrix X represents the history of traffic volume on the corresponding application link (e.g., link A-B (application component A, application component B)). The traffic matrix X indicates the dynamic connectivity relationships of all application components over both the spatial and temporal domains.

After preprocessing the data, the dependency decomposition unit 114 of the controller 110 performs a dependency decomposition process on the data. The dependency decomposition unit 114 does not assume prior knowledge of the number of applications running in the data center, which is important system information, especially when decomposing system components on a per-application basis. The dependency decomposition unit 114 determines or estimates the number of applications running in the data center with a rank estimation via power factorization or singular value decomposition (SVD) based method. The estimated number of applications is further used in a dependency decomposition algorithm to discover the application dependencies.

The application dependencies discovered by the dependency decomposition unit 114 are postprocessed by the postprocessing unit 116 of the controller 110. Application dependencies generated in the previous components may be affected by measurement noise and contain false positives. Thus, postprocessing is necessary to cross-validate the results and reduce inaccurate inferences. The postprocessing unit 116 of the present disclosure uses a concurrent volume ratio (CVR) based correlation to locally identify correlated edges in the dependency subgraphs using pairwise link correlation on each node of the dependency subgraph. The postprocessing unit 116 also applies rules for fusion and pruning the dependency graphs. These rules leverage domain knowledge of the operator as well as empirical observation of the traffic correlation scores.

Figure 3:
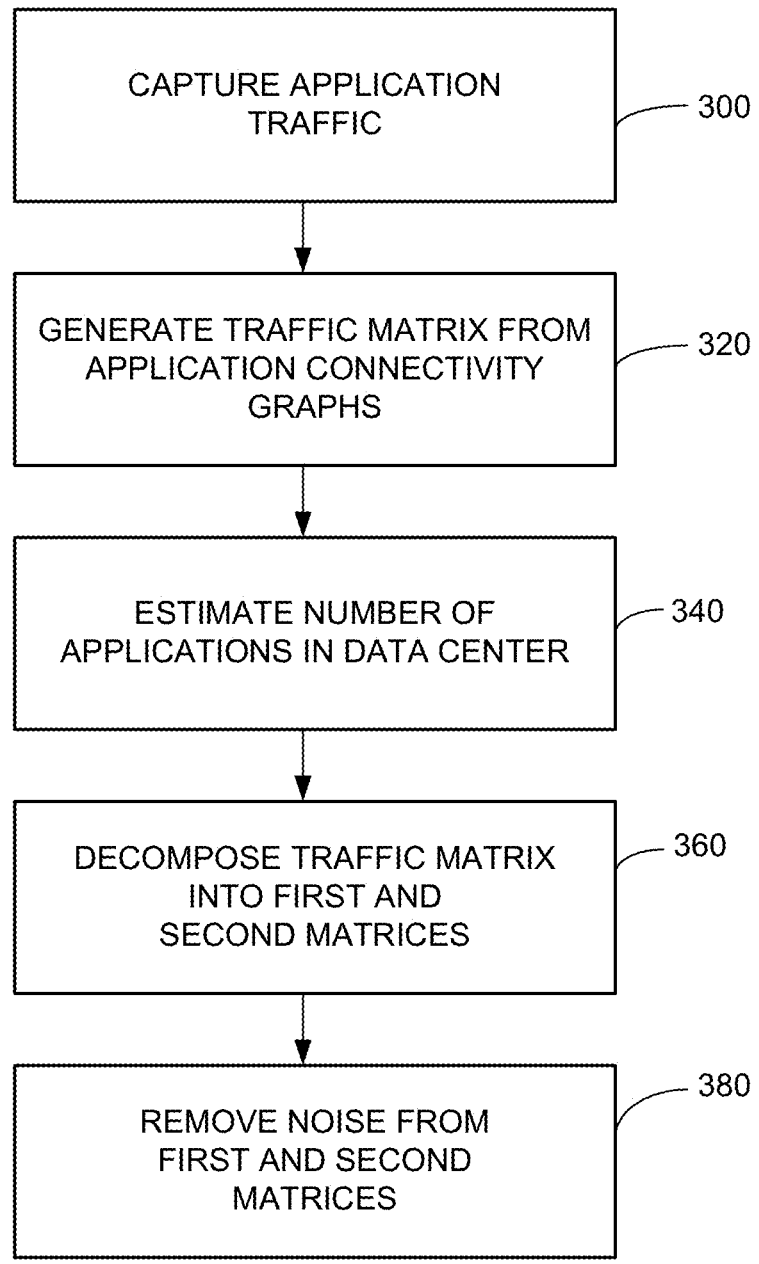
FIG. 3 is a flowchart of an exemplary embodiment of a data center application dependency discovery method performed by the system of the present disclosure.

FIG. 3 is a flowchart of an exemplary embodiment of the data center application dependency discovery method performed by the system of the present disclosure. The method commences in block 300 with the capturing of application traffic volume data on the servers in spatial and temporal domains. The traffic volume data is captured by the edge switches 102, which are directly connected to associated monitoring agents 104. The monitoring agent 104 periodically processes the collected data, calculates the traffic volume for each application layer link, and forwards the data to the controller 110.

Moving to block 320, the preprocessing unit 112 of the controller 110 generates application-layer connectivity graphs. Each graph is represented by an application traffic matrix (traffic matrix X) for all the components of the applications based on the application traffic volume data. The connectivity graph generation mechanism involves identification of service nodes (using a number of incoming connections), aggregation of transient connections into a single edge and identification of client facing nodes based on client IP address distribution. A service node with many different client IP addresses is likely to be a client facing service node (or src node in the connectivity graph). This step also identifies and removes common service nodes of the data center which are used by all applications (e.g., DNS) to split a large complex graph into simpler graphs representing individual application groups.

In block 340, the traffic matrix X is used by the dependency decomposition unit 114 of the controller 110 to estimate the number of the applications in the data center. The dependency decomposition unit 114 of the controller 110 in block 360, decomposes the traffic matrix X into first and second matrices W, H (denoted generally by reference numerals 210 and 220, respectively, in FIG. 2) using the number of applications estimated in block 340. The first matrix W represents a set of the components belonging to each of the applications, i.e., the application dependency path, and the second matrix H represents the amount of traffic generated by each application over time. The postprocessing unit 116 of the controller 110, in block 380, removes noise from the first and second matrices W, H.

Referring again to block 340 of FIG. 3, the dependency decomposition unit 114 of the controller 110 uses singular vector decomposition (SVD) or Power Factorization based solvers under complete and incomplete traffic data scenarios to find the optimal rank of the traffic matrix X by low rank estimation. In the case of complete input data, the number of applications is estimated by solving the rank minimization problem (RMP), via a SVD solver. The RMP minimizes $\|X-\tilde{X}\|$, where $\tilde{X}=U\Sigma_{i=1}^{k}V^T$, U is a n×n unitary matrix (i.e., $U^TU=I$), V is a m×m unitary matrix (i.e., $V^TV=I$) and the matrix $\Sigma_{i=1}^{k}$ is n×m a diagonal matrix with the largest k singular values $\delta_i$ from $\Sigma$, which is a n×m diagonal matrix. The best rank r approximation of traffic matrix X is k if $\|X-\tilde{X}\|\leq\epsilon$, $\epsilon$ is the tolerance for noise. In the case of incomplete input data, because the traffic matrix X may be missing some items, Power Factorization is a numerically robust solver to compute two matrix factors A and B with dimensions n*r and r*m respectively, such that matrix distance $\|M\cdot(X-AB)\|$ is minimized (where M is a mask matrix of binary entries, Mij equals 0 if $X_{ij}$ is missing, otherwise, $M_{ij}$ is 1). Given r<min(m,n), the method may use the Power Factorization process depicted in the flow chart of FIG. 4A to compute the best rank r approximation of X, given r known.

Figure 4A:
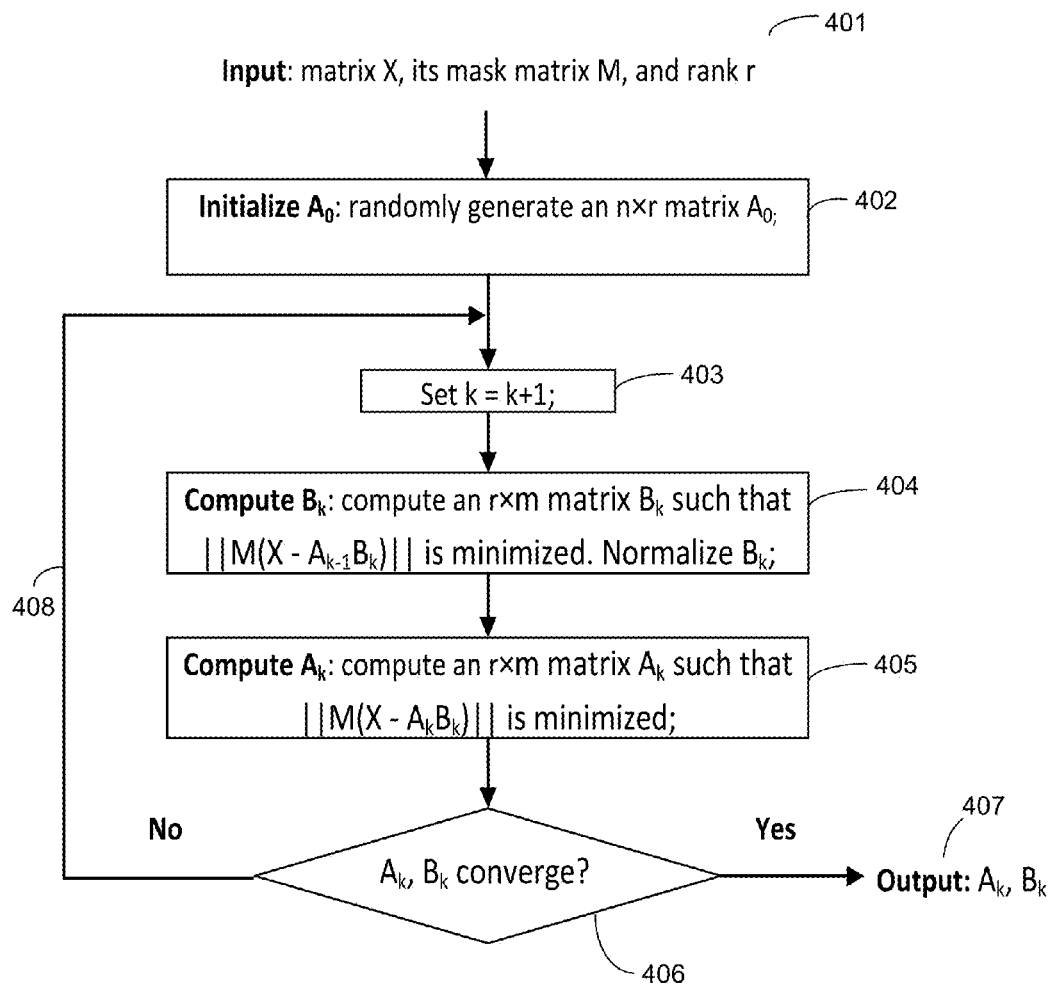
FIG. 4A is a flowchart of an exemplary embodiment of a Power Factorization process used in the method of FIG. 3.

In FIG. 4A, the traffic matrix X, its mask matrix M, and rank r are inputs 401 for the Power Factorization process. In block 402, the Power Factorization process commences with a random matrix $A_0$ having a size n*r and set k-th interation k equal to 0. In block 403, k-th interation k is set equal to k+1. In block 404, given matrix $A_{k-1}$, an r*m sized matrix $B_k$ is computed so that matrix distance $\|M\cdot(X-A_{k-1}B_k)\|$ is minimized. Then, matrix $B_k$ is normalized. In block 405, given matrix $B_k$, a n*r sized matrix $A_k$ is computed so that matrix distance $\|M\cdot(X-A_kB_k)\|$ is minimized. In block 406, a determination is made as to whether matrices $A_k$ and $B_k$ have converged. If matrices $A_k$ and $B_k$ converge, then matrices $A_k$ and $B_k$ are generated at output 407. If matrices $A_k$ and $B_k$ have not converged, blocks 403, 404, 405, and 406 of the process are repeated at flow line 408 until matrices $A_k$, $B_k$ converge.

The Power Factorization process can not directly predict the rank information of traffic matrix $X_{n*m}$ (where n and m are the row and column dimensions of matrix X) where rank r must be known before optimizing matrices $A_{n*r}$ and $B_{r*m}$. However, searching rank r within a reasonable range and plotting the final approximation errors for matrix distance ($\|M\cdot(X-AB)\|$) against rank r, may be a strong heuristics indicating the true rank $\hat{r}$ (or the rank of matrix X) where the error curve has a saddle point. Note that with rank r increasing, the error for matrix distance $\|M\cdot(X-AB)\|$ is monotonically decreasing though not too much smaller after passing the true rank $\hat{r}$. If $A_r$ and $B_r$ denote the two matrix factors given any rank r, then error $\epsilon_r$ denotes the corresponding fitting error for rank r approximation. The present disclosure provides a process depicted in the flow chart of FIG. 4B, which summarizes a method for estimating the rank of the incomplete matrix X via Power Factorization residue error analysis. A Power Factorization solver is used in each iteration until convergence. This Power Factorization method is applicable for both a complete matrix X, or a matrix X with missing values.

Figure 4B:
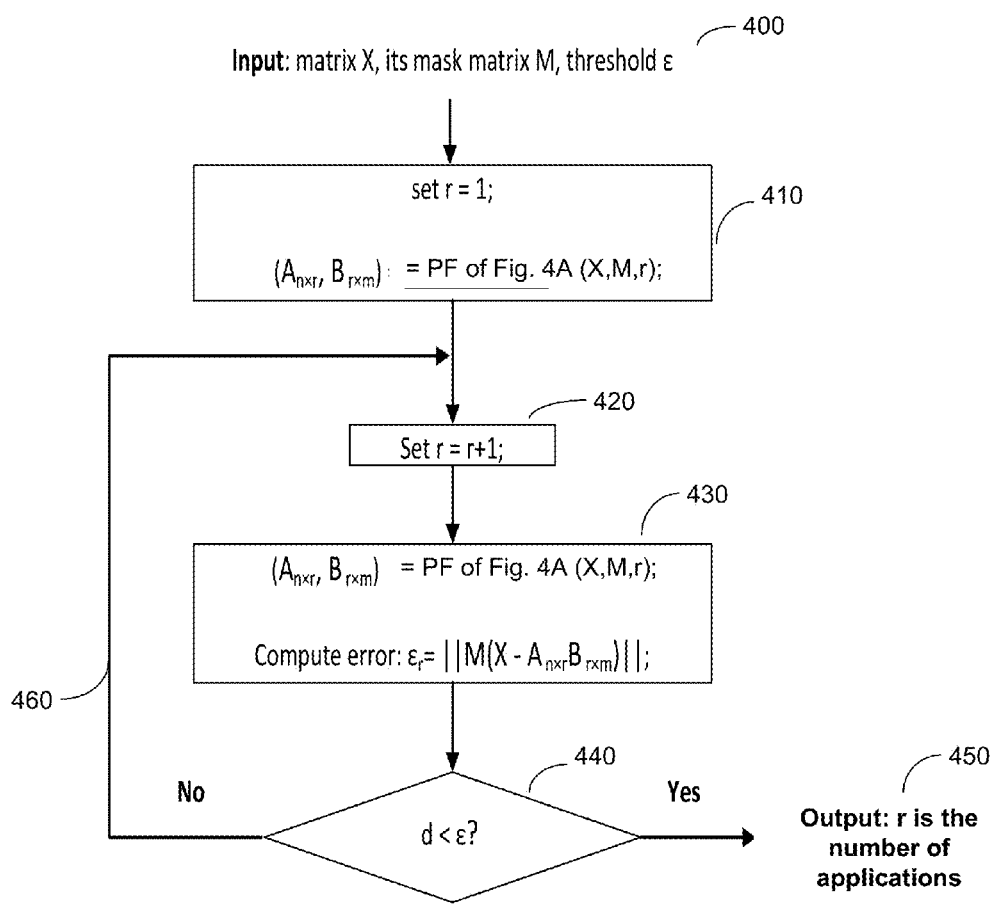
FIG. 4B is a flowchart of an exemplary embodiment of a Rank Estimation via Power Factorization Residue Errors process used in the method of FIG. 3.

In FIG. 4B, the traffic matrix X, its mask matrix M, and threshold $\epsilon$ (the threshold of converge criteria for fitting error difference). are inputs 400 for the Rank Estimation via Power Factorization Residue Errors (REPFRE) process. The REPFRE process commences in block 410 by setting rank r equal to 1, setting $A_{n*r}$, $B_{r*m}$ equal to the Power Factorization process PF of FIG. 4A, and computing fitting error $\epsilon_r$ for rank r as $\|M(X-A_{n*r}B_{r*m})\|$. In block 420, rank r is set equal to r+1. In block 430, $A_{n*r}$, $B_{r*m}$ is set equal to the Power Factorization process PF of FIG. 4A, the fitting error $\epsilon_r$ for rank r (r+1) is computed as $\|M(X-A_{n*r}B_{r*m})\|$ and the error difference d is computed as $\tilde{d}_{(i-1,i)}=\epsilon_{r-1}-\epsilon_r$. In block 440, a determination is made as whether difference d is less than threshold $\epsilon$. If difference d is less than thresholds $\epsilon$, then the estimated rank of matrix X is set as rank r at output 450, where rank r is the number of applications. If difference d is not less than threshold $\epsilon$, then blocks 420, 430 and 440 of the REPFRE process are repeated at flow line 460.

Referring again to block 360 of FIG. 3, the dependency decomposition unit 114 of the controller 110 may use non-negative matrix factorization (NMF) to discover the dependent application services (features) over the high dimensional traffic data. NMF is an unsupervised learning algorithm for matrix factorization under the non-negativity constraints which are applicable for the non-negative additive nature of application pattern combinations. Given a non-negative n*m matrix X, NMF finds the non-negative n*r matrix W and non-negative r*m matrix H such that:

$$X_{n*m} \approx W_{n*r} \cdot H_{r*m}.$$

Because matrix X represents the traffic measured over time, each column vector in matrix W can be used to interpret an application dependency subgraph where traffic volumes on different links $W_{i_1*j}$ and $W_{i_2*j}$ keep some linear correlations.

Each column vector in matrix H indicates the weights of range r applications for different request workloads at each time snapshot.

In one embodiment, the following multiplicative update rules are selected to minimize objective function $\|X-WH\|^2$ to obtain matrices W and H:

$$W_{i\alpha} \leftarrow W_{i\alpha} \frac{(XH^T)_{i\alpha}}{(WHH^T)_{i\alpha}}$$

$$H_{\alpha\mu} \leftarrow H_{\alpha\mu} \frac{(W^TX)_{\alpha\mu}}{(W^TWH)_{\alpha\mu}}.$$

These update rules are straightforward to implement and employ alternatively as solving a bilinear problem: fixing matrix H to optimize matrix M and then fixing matrix M to solve matrix H in each optimization loop. They converge faster compared to regular gradient descend methods. The initialization of matrix H at first iteration can be chosen randomly. The other important property of NMF is its spatial locality or sparseness of factorized bases, which is particularly applicable to application level event discovery, composed of localized link observations.

The reasoning behind the application of NMF in application dependency decomposition is threefold. First, the observed traffic matrix X is non-negative which naturally matches with the constraints on input data for NMF. Second, NMF does not allow negative entries in both matrix factors W and H. It means only additive combinations of the basis components are allowed, which is consistent with our assumption that the traffic measurement (non-negative by nature) on each link is the summation of the workloads caused by multiple application events. Third, NMF is also a global-scaled graph decomposition method which can discover or extract the latent, statistical dependency traffic patterns as subgraphs, for possible semantic interpretation. Comparing with other matrix factorization techniques, such as PCA and Independent Component Analysis, NMF produces more semantically meaningful results given our traffic data due to the non-negative constraints.

Figure 5:
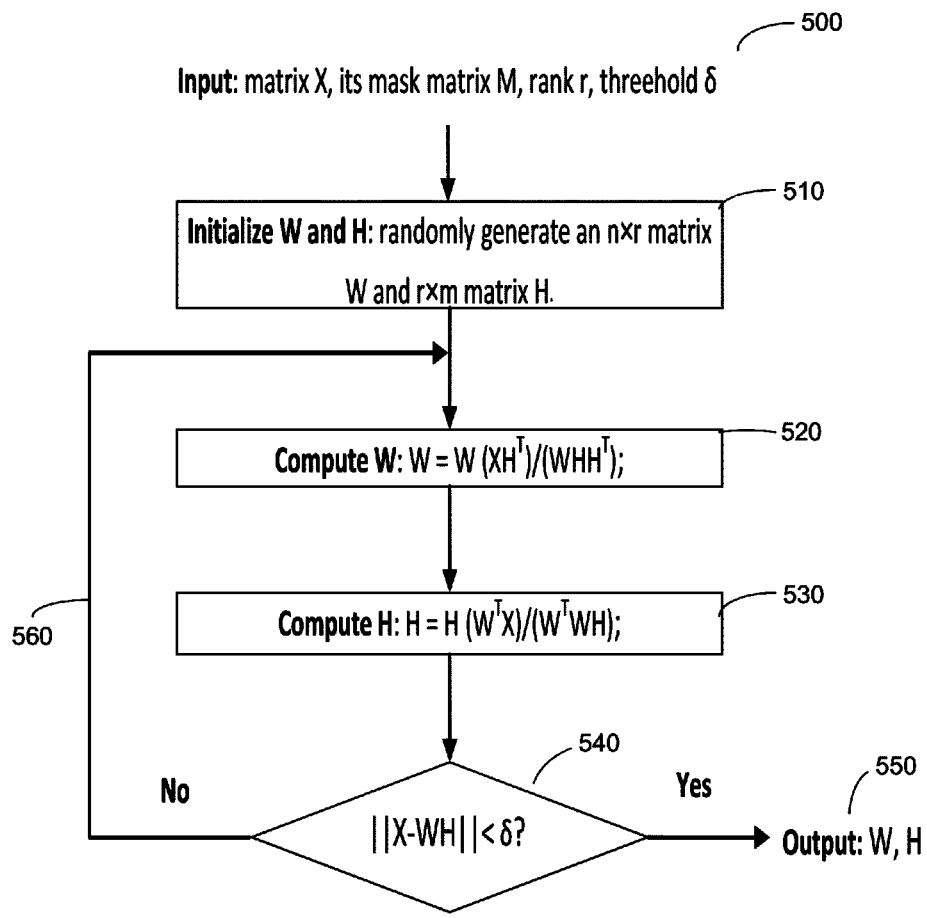
FIG. 5 is a flowchart of an exemplary embodiment of a dependency decomposition process based on non-negative matrix factorization, which is used in the method of FIG. 3.

FIG. 5 is a flowchart of an exemplary embodiment of the NMF-based dependency decomposition process performed by the dependency decomposition unit 114 of the controller 110. The traffic matrix X, its mask matrix M, rank r and threshold δ are inputs 500 for the NMF-based dependency decomposition process. In block 510, the NMF-based dependency decomposition process commences with randomly generating an n*r matrix W and an r*m matrix H. In block 520, matrix W is computed as $W(XH^T)/(WHH^T)$. In block 530, matrix H is computed as $H(W^TX)/(W^TWH)$. In block 540, a determination is made as to whether matrix distance $\|X-WH\|$ is less than threshold δ. If matrix distance $\|X-WH\|$ is less than threshold δ, then matrices W, H are generated at output 550. If $\|X-WH\|$ is not less than threshold δ, then blocks 520, 530, and 540 of the process are repeated at flow line 560 until $\|X-WH\|$ is less than threshold δ.

Figure 6:
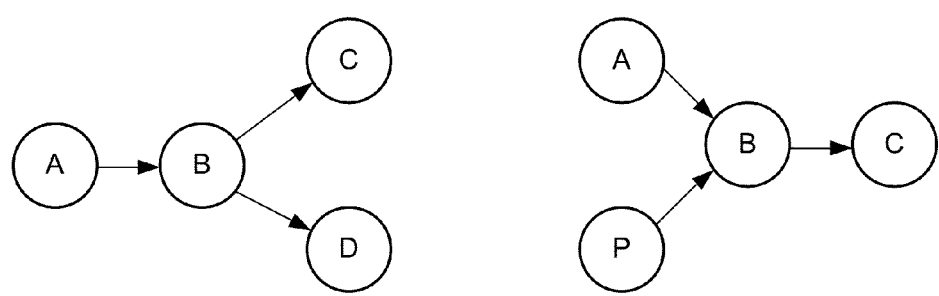
FIG. 6 is a graphical depiction of a concurrent volume ratios (CVR) based correlation process used in the method of FIG. 3, to correlate application traffic on neighboring links.

Referring again to block 380 of FIG. 3, the postprocessing unit 116 of the controller 110 may use a concurrent volume ratios (CVR) based correlation technique to correlate application traffic on neighboring links, especially for cases where multiple input or output connections are present, as shown for example in FIG. 6. This process validates the result of the dependency decomposition process and eliminates noise.

In CVR correlation process, vector $v_i$ represents the aggregated traffic volume on application component link $L_i$ over any certain time interval T. Then, the CVR correlation process on two consecutive application component links $L_i$ and $L_j$ are measured with:

$$V_{ij}^c = \frac{\sum v_j * l_{ij}}{\sum v_j} \text{ and } V_{ij}^e = \frac{\sum v_i * l_{ij}}{\sum v_i},$$

where $l_{ij}$ is a 0/1 vector indicating the concurrency of vectors $v_i$ and $v_j$ in synchronized time intervals. Specifically, 0/1 vector $l_{ij}^t$ is set to 1 when both links $L_i$ and $L_j$ have traffic going through in time interval t and to 0 otherwise. We use CVR scores $V_{ij}^c$ and $V_{ij}^e$ (where superscript c represents the proportion $L_j$ caused by $L_i$ and superscript e represents the proportion of $L_i$ resulting in $L_j$; i.e., to indicate causal relation between application component links) to roughly estimate the causal correlation of the traffic on links $L_i$ and $L_j$. Intuitively, CVR score $V_{ij}^c$; represents the ratio of the traffic volume on link $L_j$ caused by link $L_i$, over the total traffic volume on link $L_j$, and CVR score $V_{ij}^e$; calculates the ratio of the traffic volume on link $L_i$ that will result in events on link $L_j$ over the total of the traffic volume on link $L_i$.

Referring again to FIG. 6, a high CVR score between application component links A-B and B-C, indicates causal relationship, i.e., A-B-C is a dependency path. Likewise, a low CVR score between A-B and B-D, indicates A-B and B-D are independent links. This leads to a splitting of the connectivity graph into two connected components (or applications) A-B-C and B-D. Furthermore, the CVR score is calculated by evaluating $V_{ij}^c$ and $V_{ij}^e$ for different time intervals T, e.g., 300 ms, 500 ms, 1 sec, 10 sec, . . . . Note that for dependent application links, the CVR score is stable over different time intervals, while for independent links, there is a sudden decrease in CVR score at a particular time interval. This is because at very small time interval even a high request rate does not cause aggregated traffic volumes to give high CVR scores.

In one exemplary embodiment, the post processing rules may be as follows. For a single input/output, if CVR scores and $V_{ij}^c$ and $V_{ij}^e$ are high in all time intervals, application component links $L_i$, $L_j$ are dependent pair. For multiple input with multiple outputs, calculate CVR scores and $V_{ij}^c$ $V_{ij}^e$ for all links i and j, and measure their stability across different time intervals 30 sec, 10 sec, 1 sec, 500 ms. Based on this, dependent and independent links are identified. Like other pair wise correlation techniques, CVR is not suitable to identify the whole dependency path in multi-tier networks. Instead, it is useful to validate the output of decomposition stage (NMF) and filter out false positives. On the other hand, even though it is possible to use CVR to identify local pair-wise dependency relationship, and then link or stitch pairs to form a higher-order application-level dependency subgraph, this process may be error-prone since all local pairs are required to be identified and grouped correctly, which is not trivial. The strategy of using a global data matrix representation, and top-down application-level decomposition followed by local CVR based validation can achieve a better balance of statistical robustness and accuracy.

Figure 7:
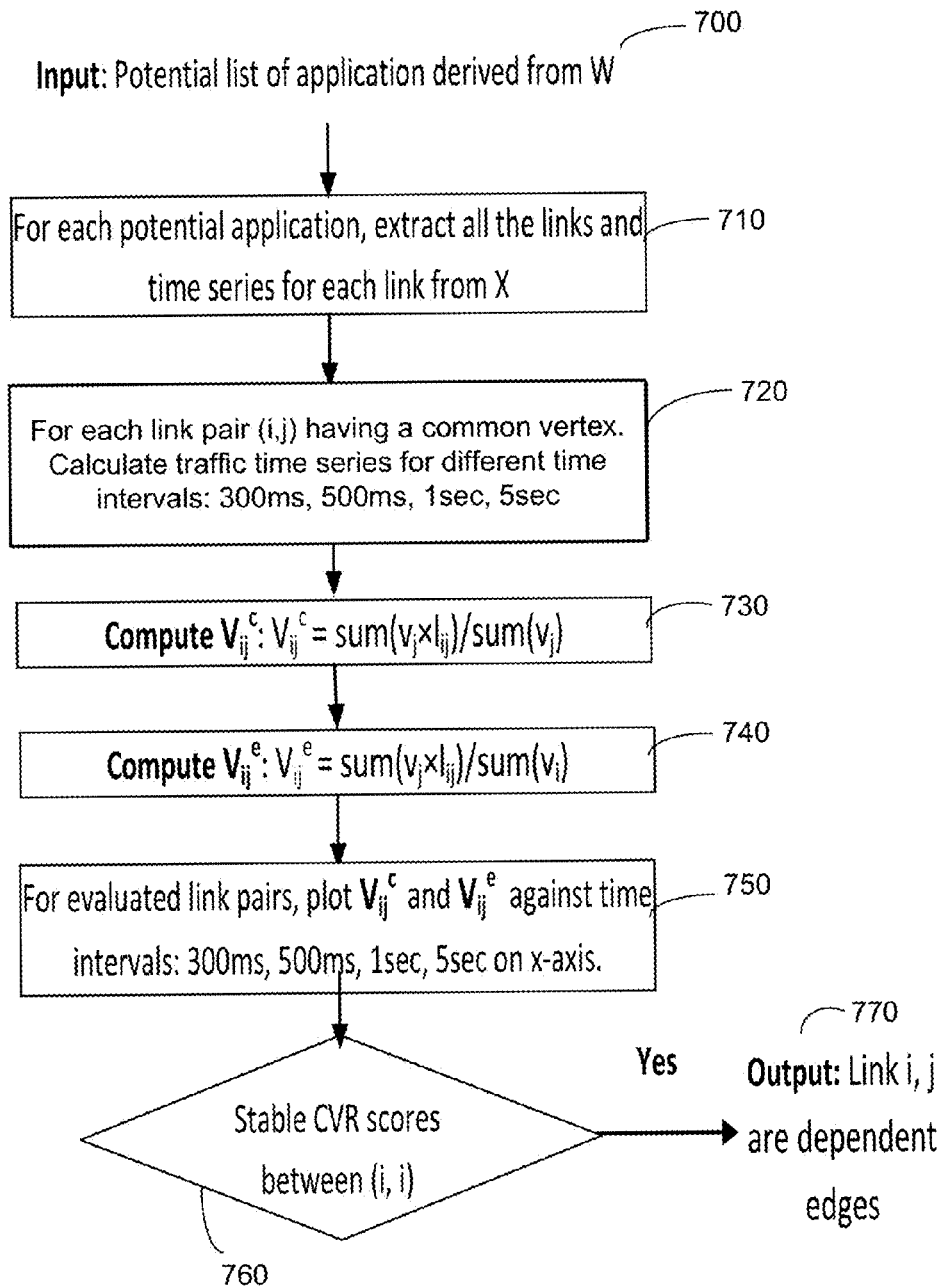
FIG. 7 is a flowchart of an exemplary embodiment of the CVR correlation process.

FIG. 7 is a flowchart of the CVR correlation process performed by the postprocessing unit 116 of the controller 110. The potential list of applications derived from matrix W at the output of the dependency decomposition unit 114 of the controller 110 are inputs 700 for CVR correlation process. In block 710, all the application component links and time series for each link are extracted from matrix X for each potential application. In block 720, traffic time series are calculated for different time intervals for each link pair (i,j) having a common vertex. In block 730, CVR score $V_{ij}^c$ is computed as $sum(v_j * l_{ij})/sum(v_j)$. In block 740, CVR score $V_{ij}^e$ is computed as $sum(v_j * l_{ij})/sum(v_i)$. In block 750, CVR scores $V_{ij}^c$ and $V_{ij}^e$ are plotted against time interval on an x-axis, for evaluated link pairs. In block 760, a determination is made as to whether the CVR scores are stable between link (i,j). If the CVR scores are stable between link i,j, an indication that link i,j are dependent edges is generated at output 770. This output at 770 is used in the postprocessing 116 before finally giving the individual applications as the output of the overall process (output at 380).

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method for determining application dependency paths in a data center having a plurality of servers and a plurality of different applications, each of the applications having a plurality of components, one or more of the components being shared with one or more of the other applications, the method comprising the steps of:
    capturing application traffic volume data on the servers;
    generating an application traffic matrix of all the components of the applications based on the application traffic volume data;
    estimating the number of the applications in the data center from the application traffic matrix;
    decomposing the application traffic matrix into a first matrix and a second matrix using the estimated number of applications, the first matrix representing a set of the components belonging to each of the applications and the second matrix representing the amount of traffic generated by each application over time; and
    removing noise from the first and second matrices, wherein the step of removing noise is performed with a concurrent volume ratios based correlation process.

2. The method of claim 1, wherein the step of capturing application traffic volume data on the servers is performed in spatial and temporal domains.

3. The method of claim 1, wherein the step of generating the application traffic matrix comprises generating application connectivity graphs for groups of the applications, the connectivity graphs represented by the application traffic matrix.

4. The method of claim 1, wherein the step of estimating the number of the applications is performed with a Rank Estimation via Singular Value Decomposition or Power Factorization Residue Errors process.

5. The method of claim 4, wherein the Rank Estimation via Power Factorization Residue Errors process uses a Power Factorization process.

6. The method of claim 1 wherein the step of decomposing the traffic matrix is performed with a non-negative matrix factorization process.

7. A system for determining application dependency paths in a data center having a plurality of servers and a plurality of different applications, each of the applications having a plurality of components, one or more of the components being shared with one or more of the other applications, the system comprising:
    a data collection component; and
    a controller in data communication with the data collection component;
    the data collection component comprising:
        a plurality of switches each having a mirror port for capturing application traffic volume data on the servers; and
        a monitoring agent for monitoring each of the mirror ports;
    the controller comprising:
        a preprocessing unit including a connectivity graphing unit for generating an application traffic matrix of all the components of the applications based on the application traffic volume data captured by the monitoring server;
        an application decomposition unit for estimating the number of the applications in the data center from the application traffic matrix generated by the connectivity graphing unit and for decomposing the application traffic matrix into a first matrix and a second matrix using the estimated number of applications, the first matrix representing a set of the components belonging to each of the applications and the second matrix representing the amount of traffic generated by each application over time; and
        a postprocessing unit for removing noise from the first and second matrices, wherein the postprocessing unit performs a concurrent volume ratios based correlation process to remove noise from the first and second matrices.

8. The system of claim 7, wherein the switches capture the application traffic volume data in spatial and temporal domains.

9. The system of claim 7, wherein the application traffic matrix represents application connectivity graphs for groups of the applications.

10. The system of claim 7, wherein the application decomposition unit performs a Rank Estimation via Singular Value Decomposition or Power Factorization Residue Errors process to estimate the number of the applications in the data center.

11. The system of claim 10, wherein the Rank Estimation via Power Factorization Residue Errors process uses a Power Factorization process.

12. The system of claim 7, wherein the application decomposition unit performs a non-negative matrix factorization process to decompose the traffic matrix into the first and second matrices.

* * * * *